United States Patent
King et al.

(10) Patent No.: US 9,085,281 B2
(45) Date of Patent: Jul. 21, 2015

(54) KEYLESS ENTRY MULTI-CHANNEL RKE SYSTEM

(75) Inventors: Ronald O. King, Brownstown, MI (US); John S. Nantz, Brighton, MI (US); Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 617 days.

(21) Appl. No.: 11/707,186

(22) Filed: Feb. 15, 2007

(65) Prior Publication Data

US 2008/0197987 A1    Aug. 21, 2008

(51) Int. Cl.
*B60R 25/00*    (2013.01)
*B60R 25/24*    (2013.01)
*B60R 25/20*    (2013.01)

(52) U.S. Cl.
CPC ............. *B60R 25/24* (2013.01); *B60R 25/2072* (2013.01)

(58) Field of Classification Search
USPC ......................................................... 340/5.72
See application file for complete search history.

(56) References Cited

U.S. PATENT DOCUMENTS

| | | | | |
|---|---|---|---|---|
| 5,355,518 | A * | 10/1994 | Kindinger et al. | 340/7.34 |
| 5,708,415 | A * | 1/1998 | Van Lente et al. | 340/525 |
| 5,734,328 | A | 3/1998 | Shinbori | |
| 6,434,132 | B1 * | 8/2002 | Ishii et al. | 370/338 |
| 6,801,134 | B1 * | 10/2004 | Juzswik | 340/825.69 |
| 7,170,401 | B1 * | 1/2007 | Cole | 340/457 |
| 2005/0237163 | A1 | 10/2005 | Lee et al. | |
| 2006/0112287 | A1 * | 5/2006 | Paljug | 713/300 |
| 2006/0176147 | A1 * | 8/2006 | Pohlmann et al. | 340/5.61 |
| 2006/0202798 | A1 * | 9/2006 | Baumgartner et al. | 340/5.61 |
| 2007/0091813 | A1 * | 4/2007 | Richard et al. | 370/248 |
| 2007/0164876 | A1 * | 7/2007 | Ostrander et al. | 340/825.72 |
| 2008/0068207 | A1 * | 3/2008 | Elberbaum | 340/825.72 |

FOREIGN PATENT DOCUMENTS

| | | |
|---|---|---|
| DE | 10109869 A1 | 7/2002 |
| WO | WO 2005/006569 | 1/2005 |
| WO | WO 2005/046151 | 5/2005 |
| WO | WO 2005/109328 | 11/2005 |
| WO | WO 2006/099079 | 9/2006 |

OTHER PUBLICATIONS

German Search Report for Application No. 10 2008 0007 834.4 dated Nov. 21, 2013.

* cited by examiner

*Primary Examiner* — Curtis King
(74) *Attorney, Agent, or Firm* — MacMillan, Sobanski & Todd, LLC

(57) ABSTRACT

A remote keyless entry system includes a portable communication device for communicating with an electronic control module of a transportation vehicle. The transmitter has at least two selectable communication channels for broadcasting communications signals to the transportation vehicle. A vehicle based electronic control module communicates with the portable communication device. The electronic control module includes a receiver that includes at least two selectable communication channels for receiving RF signals from the portable communication device. A controller selectively energizes the receiver for measuring a RSSI voltage level of each selectable communication channel of the receiver over respective predetermined time periods. The controller determines which of the at least two selectable communication channels includes a lowest noise level based on the measured RSSI voltage level. A channel status update signal is broadcast from the electronic control module to the portable communication device identifying the selected communication channel having the lowest noise level.

7 Claims, 5 Drawing Sheets

KEYLESS ENTRY MULTI-CHANNEL RKE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to RKE systems, and more specifically, RKE system using multi-channel communications.

2. Background of Related Art

Remote vehicle entry transmitters/receivers are used for performing a wireless operation on a vehicle such as locking and unlocking a vehicle door, unlatching a trunk latch, or activating or deactivating an alarm system equipped on the vehicle. This remote entry device is commonly referred to a remote keyless entry (RKE) fob. The RKE fob is typically a small rectangular or oval plastic housing with a plurality of depressible buttons for activating each one of the wireless operations. The RKE fob is carried with the operator of a vehicle and can wirelessly perform these functions when within a predetermined reception range of the vehicle.

The RKE fob communicates with an electronic control module within the vehicle via a RF communication signal. The operator, when positioned outside of the vehicle, depresses one of the buttons on the RKE fob which broadcasts a wireless signal that is received by the electronic control module when the RKE fob is within a broadcasting range of the vehicle. The electronic communication module upon receiving the broadcast signal authenticates the signal and performs the requested keyless entry function if the signal is validated.

The receiver of the RKE electronic control module may experience interference from other communication modules within the vehicle system such as a tire pressure monitoring (TPM) system. A TPM system disposes pressure sensors on or within vehicle tires to sense the pressure within a respective tire and report low or high pressure conditions to a driver. TPM systems sense tire pressure within a tire and transmit a signal to a body-mounted receiving unit located external to the tire for processing tire pressure data. Interference may occur when the signal transmitted by the transmitting devices of TPM system is broadcast in the same operating frequency of the RKE receiver.

Multiple communication channels may be used to transmit between the electronic control module and the RKE fob; however, power consumption is an issue if the receiver is required to dwell on all channels waiting for a signal to be broadcast. This will increase in the power consumption and the "on time" of the receiver in the electronic control module to monitor for the signal on all channels. This extended time period to search all channels and determine if a signal is present increases the quiescent current of the receiver and therefore cause a drain on the vehicle power supply system.

BRIEF SUMMARY OF THE INVENTION

The present invention provides an advantage of utilizing multiple communication channels between a portable communication device and an electronic control module to avoid interference by other RF devices that operating within a same operating range of a single communication channel while minimizing the power required to operate the receiving unit of the electronic communication module.

In one aspect of the present invention, a remote keyless entry system is provided for a transportation vehicle. A portable communication device includes a transmitter for broadcasting remote keyless entry commands on any one of a plurality of channels. The portable communication device generates a remote keyless entry command in response to a manual activation identifying a remote keyless entry action. The transmitter broadcasts the remote keyless entry command using a preferred channel in response to the manual activation. A vehicle based electronic control module communicates with the portable communication device and controls keyless entry functions within the transportation vehicle. The electronic control module includes a receiver for receiving remote keyless entry commands at any one of the plurality of channels. The electronic control module includes a RSSI circuit for determining a preferred channel having a lowest noise level. The electronic communication module further includes a controller for monitoring transmitted remote keyless entry commands from the portable communication device at the preferred channel for a predetermined interval. The controller re-determines the preferred channel after the predetermined interval and repeats the monitoring for a transmitted remote keyless entry command on the re-determined preferred channel. The electronic control module further includes a transmitter for transmitting a channel status update signal to the portable communication device identifying the preferred channel during predetermined events. The portable communication device determines whether the electronic control module acknowledges the transmitted remote keyless entry command. The portable communication device recursively transmits the remote keyless entry command at each of the plurality of channels until the vehicle controller acknowledges the transmitted remote keyless entry command.

In yet another aspect of the present invention, a method is provided for selectively activating a two-way communication channel between an electronic control module and a portable communication device in a multi-channel remote keyless (RKE) system. The selected channel has a lowest noise level in the multi-channel remote keyless entry (RKE) system. A receiving circuit is energizing. A RSSI voltage level of the first communication channel of a vehicle based electronic control module is measured during a first predetermined period of time. The RSSI voltage level of a second communication channel of a vehicle based electronic control module is measured during a second predetermined period of time. The measured RSSI voltage levels of the first communication channel and second communication channel are compared to a predetermined voltage level. The respective communication channel of the electronic control module having a measured RSSI voltage level closest to the predetermined voltage level is selected. A counter for a predetermined period of time is initiated. A determination is made whether a keyless entry command signal broadcast by the portable communication device is received on the selected communication channel. The receiving circuit is de-energized for a fourth predetermined period of time. The receiving circuit re-energized. A determination is made if the third predetermined period of time has elapsed. The steps initially energizing the receiving circuit to determining if a keyless entry command signal broadcast by the communication device is received on the selected communication channel is repeated if the third predetermined period of time has elapsed. Repeating the steps of determining if a keyless entry command signal broadcast by the communication device is received on the selected communication channel to the step of determining if the third predetermined period of time has elapsed if the third period of time has not elapsed.

In yet another aspect of the present invention, a remote keyless entry system for a transportation vehicle is includes a portable communication device having a transmitter and a receiver for communicating with the transportation vehicle. The transmitter has at least two selectable communication channels for broadcasting communications signals to the transportation vehicle. A vehicle based electronic control module communicates with the portable communication device and controls keyless entry functions within the transportation vehicle. The electronic control module includes a transmitter for broadcasting communication signals to the portable communication device. A receiver receives RF signals from the portable communication device. The receiver has at least two selectable communication channels for receiving RF signals from the portable communication device. A controller that selectively energizes the receiver for measuring a RSSI voltage level of each selectable communication channel of the receiver over respective predetermined time periods. The controller determines which of the at least two selectable communication channels includes a lowest noise level based on the measured RSSI voltage level. The controller controls a broadcast of a channel status update signal to the portable communication device that identifies the selected communication channel having the lowest noise level.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
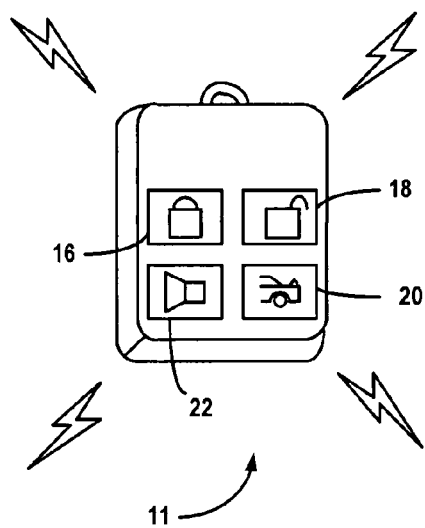
FIG. 1 is a perspective view of a vehicular remote keyless entry system according to an embodiment of the present invention.
Figure 1:
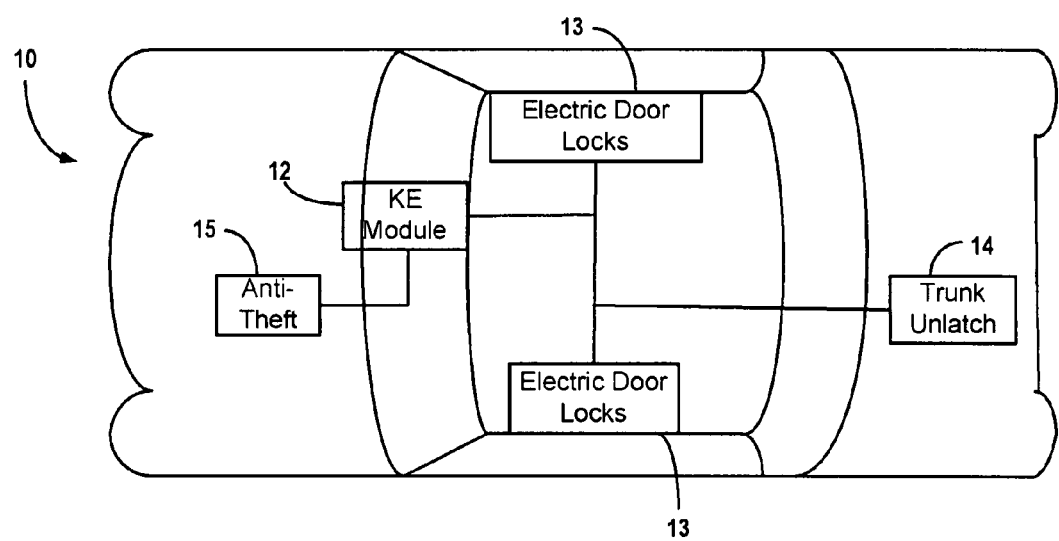

FIG. 1 shows a remote vehicle portable communication device such as a remote keyless entry (RKE) fob 11 for broadcasting RF signals (RKE command signal) to an electronic control module, such as a keyless entry module 12, located within a vehicle 10 for actuating vehicle entry functions such as unlocking and locking a vehicle door 13, unlatching a trunk latch 14, and for activating and deactivating a vehicle alarm system 15. A vehicle lock switch 16 and a vehicle unlock switch 18 are commonly disposed on a face of the RKE fob 11. The RKE fob 11 may further include a trunk unlatch switch 20 and alarm switch 22 for activating and deactivating a vehicle alarm.

The keyless entry module 12 receives the broadcast RF signal when the vehicle 10 (i.e., keyless entry module 12) is within a broadcasting range of the RKE fob 11. The keyless entry module 12 determines the validity of the RF signal broadcast by the RKE fob 11 for actuating vehicle entry functions.

Figure 2:
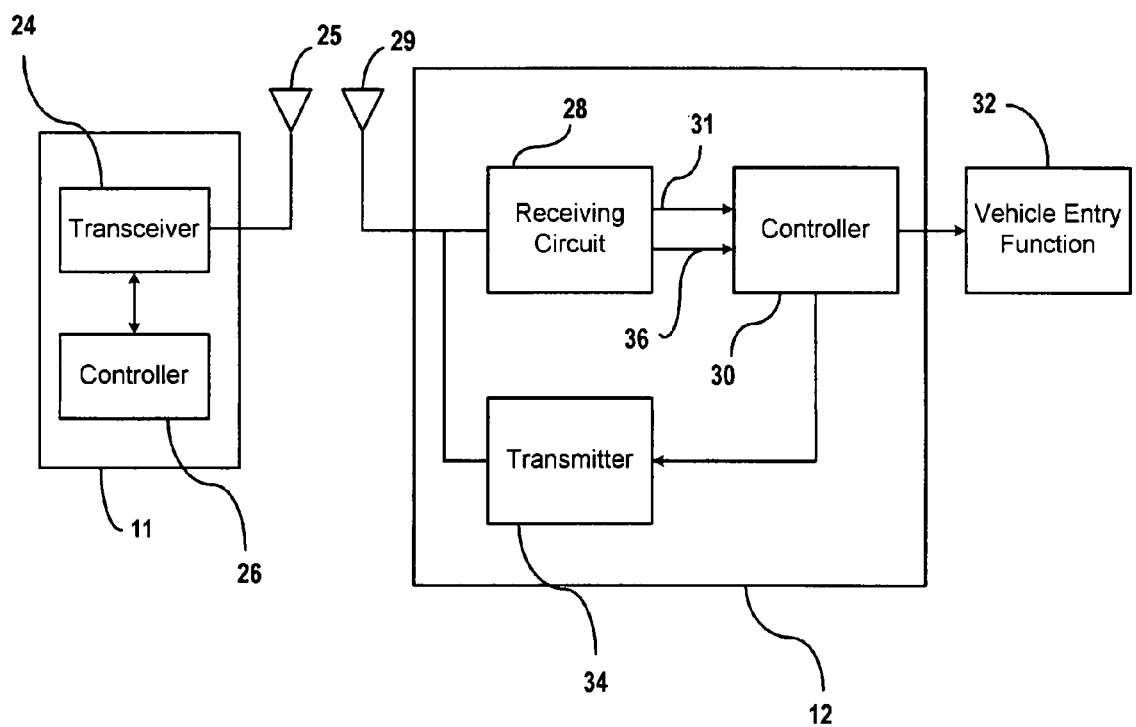
FIG. 2 is a block diagram of a vehicular-remote keyless entry system according to an embodiment of the present invention.

FIG. 2 illustrates a block diagram of a two-way RKE communication system between the RKE fob 11 and a keyless entry module 12 for actuating the vehicle entry function. The RKE fob 11 includes a transceiver 24 coupled to an antenna 25 and a controller 26 for controlling the communication to and from the RKE fob 11. Alternatively, the RKE fob 11 may include a separate transmitter and receiver as opposed to a transceiver.

The keyless entry module 12 includes a receiving circuit 28 and an antenna 29 for receiving broadcast signals from the RKE fob 11. A data line 31 communicates the received data to a controller 30. The controller 30 processes the received data from the RKE fob 11 and controls the actuation of the vehicle entry functions 32. The keyless entry module 12 further includes a transmitter 34 coupled to the antenna 31 for broadcasting response signals to the RKE fob 11.

The receiving circuit 28 is a multi-channel receiver having at least two channels for receiving RF signals from the keyless entry module 12. Any number of receiving channels of two or greater can be used. The keyless entry module 12 will utilize a respective communication channel having the least amount of noise on the channel (i.e., "cleanest channel") for communication with the RKE fob 11. The "cleanest channel" is determined by the controller 30 measuring the received signal strength indicator (RSSI) voltage level of each respective channel of the receiving circuit 28. This operation is performed on a periodic basis during all operational and non-operational times of the vehicle. Typically, a respective channel in which no signal is present and no noise is present will have a predetermined voltage level (e.g., 800 mV). The keyless entry module 12 includes a RSSI line 36 which provides a RSSI voltage for each respective channel to the controller 30. The controller 30 measures the RSSI voltage of each channel and determines which channel has a RSSI voltage level equal to the predetermined voltage level. If no channel has a RSSI voltage level equal to the predetermined voltage level, then the controller will utilize the respective channel having the lowest RSSI voltage level (i.e., a RSSI level closest to the predetermined voltage level).

Determination of the "cleanest channel" is performed by the controller 30 providing a quiescent current to turn "on" the receiving circuit 28 to scan each respective channel one at a time and measure the RSSI voltage level of each scanned channel. The RSSI voltage levels of all the channels are checked on a periodic basis (e.g., 2 seconds time intervals). Alternatively, cycle times other than 2 seconds may be utilized. The RKE fob 11 is updated upon a predetermined event occurring, such as the opening of the vehicle door. Alternatively, a predetermined event may also include, but is not limited to, closing a vehicle door, turning an ignition key to an ignition off position, or locking a vehicle door. Upon the occurrence of the predetermined event, the controller 30 broadcasts to the RKE fob 11 a LF signal (e.g., channel status update) containing an identifier of the preferred operating channel that was last recorded as having the "cleanest channel." The RKE fob 11 receives the broadcast signal containing the identifier of the preferred operating channel and the controller 26 enables the preferred operating channel as provided by the keyless entry module 12 for broadcasting future command signals from the RKE fob 11 to the keyless entry module 12. Upon the operator returning to the vehicle, the operator depresses one of the respective RKE buttons on the face of the RKE fob 11 to activate a keyless entry function. The RKE fob 11 will utilize the last identified preferred operating channel that was successfully received by the RKE fob 11 from the keyless entry module 12.

As discussed earlier, the controller 30 of the keyless entry module 12 turns on the receiving circuit 28 on a periodic basis and measures the channels to determine which of the plurality of channels is the "cleanest channel". This is performed during all operational and non-operational times of the vehicle. If the keyless entry module 12 determines another channel is the "cleanest channel" during a period of time when the operator is away from the vehicle, the new channel is enabled in the keyless entry module 12; however, the RKE fob 11 being out of the broadcast range will not receive the broadcast signal containing the updated channel status. As a result, an unsuccessful communication update occurs between the keyless entry module 12 and the RKE fob 11. As the operator approaches the vehicle and depresses one of the RKE fob buttons, the RKE fob 11 broadcasts the command signal on the respective channel identified in a last successful communication from the keyless entry module 12 to the RKE fob 11. This respective channel is no longer the "cleanest channel" as determined by the keyless entry module 12. The keyless entry module 12 will not respond to the command signal since the receiving circuit 28 has enabled a different communication channel. If an acknowledgement is not received by the RKE fob 11 from the keyless entry module 12 confirming that the keyless entry command signal was received, then after a predetermined period of time the RKE fob 11 broadcasts the command signal on a next communication channel. The RKE fob 11 will repetitiously switch channels and broadcast on each of the remaining channels until a response signal is received from the keyless entry module 12 acknowledging that the keyless entry command signal has been successfully received by the keyless entry module 12. The advantage of this RKE system is that only one channel is enabled during a single period of time, and therefore, the power consumption will be much lower than a multi-channel system that enables all channels concurrently.

Figure 3:
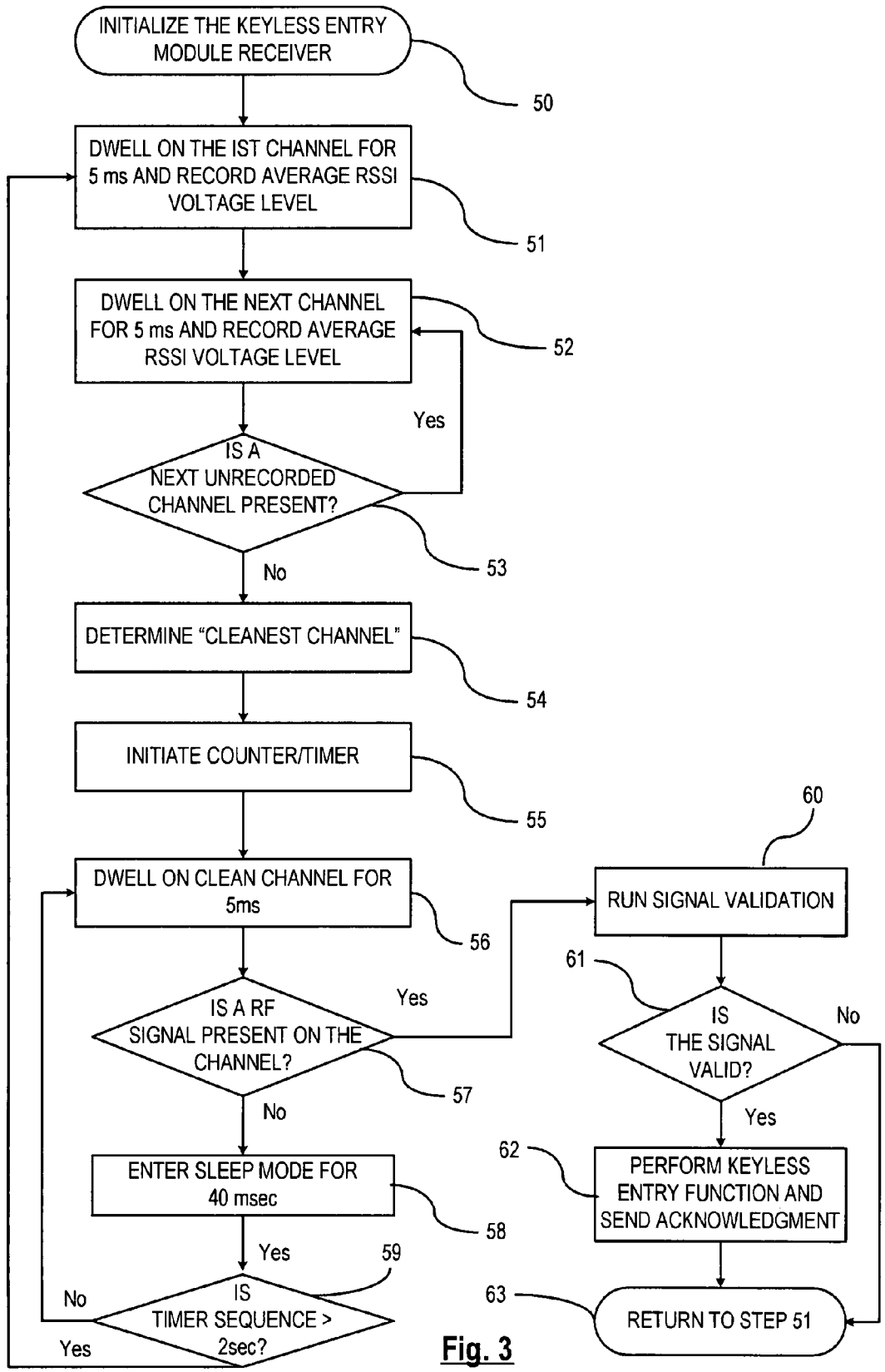
FIG. 3 is a flowchart for a selective multi-channel communication RKE system according to a first preferred embodiment of the present invention.

FIG. 3 illustrates a method for selecting a channel among a plurality of channels for communication between the RKE fob and the keyless entry module. In step 50, the keyless entry module is initialized. In step 51, a clean channel selection routine is initiated for measuring the RSSI voltage of each channel to determine the cleanest channel. The power is provided to the receiving circuit to turn on the receiving circuit for enabling a first communication channel for 5 msec. The controller measures an RSSI voltage on the first channel for 5 msec and records an average RSSI voltage level. Alternatively, enablement times other than 5 msec may be used. The routine proceeds to step 52. In step 52, the receiving circuit enables a next communication channel for 5 msec. The controller measures an RSSI voltage on the next channel for 5 msec and records an average RSSI voltage level. The routine proceeds to step 53.

In step 53, a determination is made whether a next unrecorded channel is present. If a next unrecorded channel is present, a return is made to step 52 to measure and record the RSSI voltage level of the next respective channel. The routine will continuously loop between step 52 and step 53 until all channels have been measured and recorded. In step 53, if the determination is made that all the channels have been measured and recorded, the routine proceeds to step 54.

In step 54, a determination is made as to which communication channel is the "cleanest channel" (i.e., least amount of noise). This is performed by comparing each RSSI voltage level to a predetermined voltage level which is indicative of a communication channel having no noise. The "cleanest channel" is determined as a channel having an RSSI voltage level equal to or closest to the predetermined voltage level.

In step 55, a counter (e.g., 2 second timer) is initiated in which a determination is made during this period of whether a keyless entry command signal is present on the selected channel. In step 56, the selected channel is monitored for 5 msec to determine if the keyless entry command signal received from the RKE fob is present.

In step 57, a determination is made whether a command signal is present. If the determination is made that the command signal is not present, the routine proceeds to step 58 where the receiver enters a sleep mode for 40 msec. After the 40 msec time period has elapsed, a determination is made in step 59 as to whether the 2 second polling period has expired. If the 2 second polling period has not expired, a return is made to step 56 where the receiver is energized and the selected channel (as determined in step 54) is monitored for a keyless entry command signal. In step 59, if the 2 second time period is elapsed, then a return is made to step 51 to verify the status of each channel and determine which respective channel is the "cleanest channel".

In step 57, if the determination is made that a command signal is present, then the routine proceeds to step 60 where a signal validation protocol is initiated, such as a signal validation protocol described in co-pending application co-pending U.S. patent application Ser. No. 11/536,225 filed Sep. 28, 2006, which is incorporated by reference herein in its entirety. Alternatively, signal validation protocols other than the one referenced herein may be utilized. This routine retrieves, compiles, and decodes a signal received by the keyless entry module. This protocol may include signal and data validation. For the purposes herein, a determination will only be made as to whether the signal is authentic and the data is valid. It should be understood that the signal validation protocol may include extensive procedures and analysis of signal and data validation. In step 61, a determination is made as to whether the signal and the data are valid. If the signal or data are determined invalid, then a return is made to step 51 to re-evaluate the channel selection. If the signal and the data are determined to be valid, then the routine proceeds to step 62.

In step 62, the controller of the keyless entry module enables the requested keyless entry function, which may include but is not limited to, unlocking or locking the vehicle door, unlatching a trunk, activating or deactivating an anti-theft or alarm system. An acknowledgement is transmitted from the keyless entry module to the RKE fob acknowledging that the keyless entry command signal has been successfully received and request initiated. Thereafter, the routine proceeds to step 51 to re-evaluate the channel selection.

Figure 4:
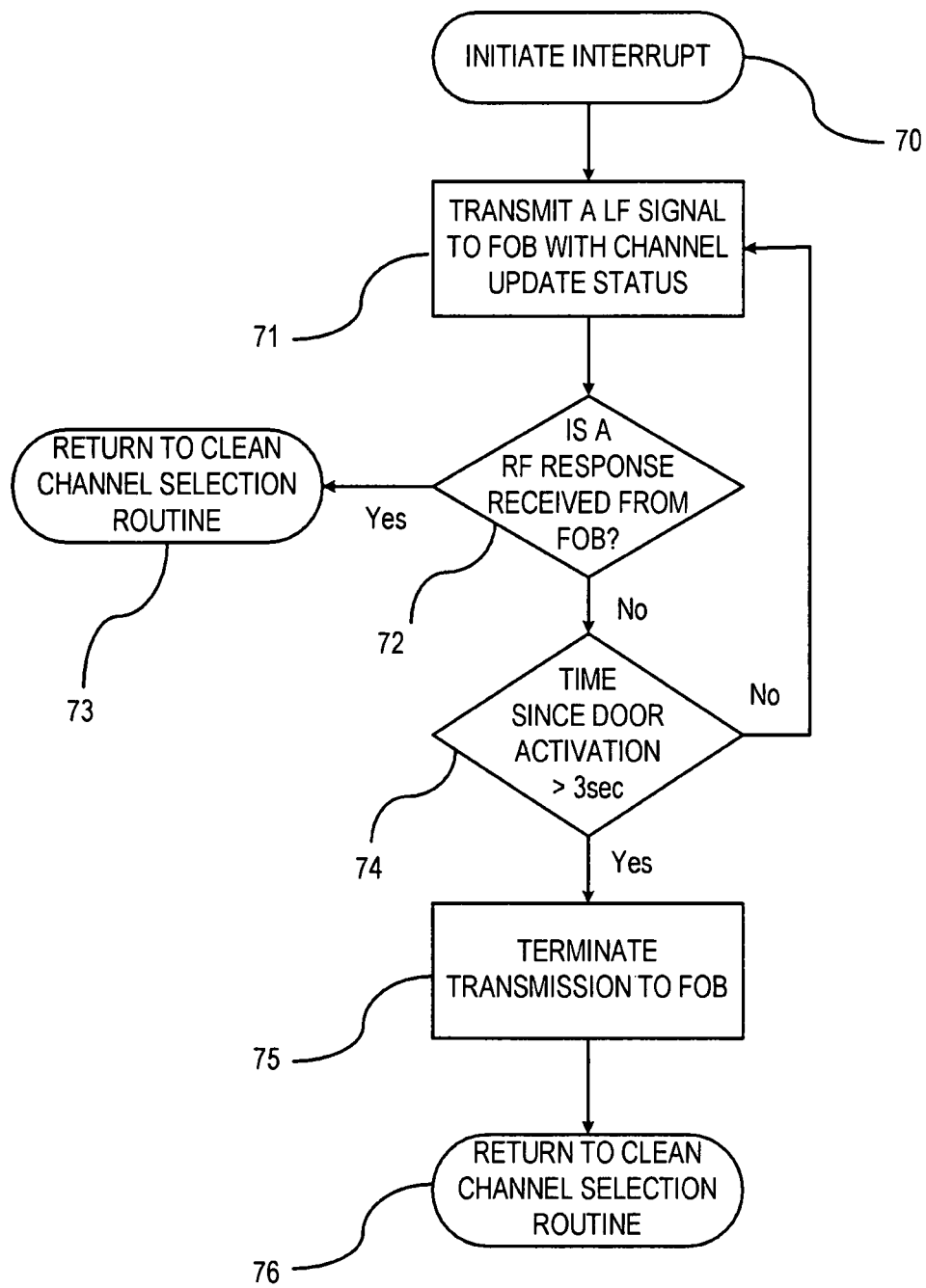
FIG. 4 is a flowchart for a selective multi-channel communication RKE system according to a first preferred embodiment of the present invention.

FIG. 4 illustrates a method for updating the RKE fob with the selected channel. Updating the RKE fob occurs during a predetermined event. Such an event may include, but is not limited to, the opening/closing of the vehicle doors. If at any time during the channel evaluation routine (shown in FIG. 3) a predetermined event occurs, an interrupt flag is initiated within the keyless entry module and the "clean channel" selection routine will immediately stop executing and the interrupt routine will be initiated in step 70. After the initiation of the interrupt routine in step 70, an LF signal (channel update status signal) is broadcast to the RKE fob identifying the channel update status as determined in step 54 (of FIG. 3). Since the predetermined event occurs in response to the opening/closing of the vehicle door, the operator of the vehicle carrying the RKE fob is in close proximity to the vehicle, and as a result, the signal may be broadcast as an LF signal due to the close proximity between the keyless entry module and the RKE fob.

After transmitting the LF signal, a determination is made in step 72 whether a response signal is received by the RKE fob. The response signal from the RKE fob is an acknowledgement that the LF signal was successfully received by the RKE fob. If the determination is made that a LF signal is received from the RKE fob, then in step 73 a return is made to the clean channel selection routine to re-evaluate for the cleanest channel. If the determination is made in step 72 that the LF signal has not been received, the routine proceeds to step 74 to determine whether a 3 second time period has elapsed since the predetermined event has occurred. If the 3 second time period has not elapsed, then a return is made to step 71 where the LF signal containing the channel status is re-broadcast to the RKE fob. In step 74, if the 3 second time period has elapsed, then the LF transmission to the RKE fob is terminated in step 75. In step 76, the interrupt routine is terminated and a return is made to the clean channel selection routine to re-evaluate for a cleanest channel. The RKE fob will continue to broadcast on the respective communication channel that was last successfully communicated to the portable communication device. Switching to the "cleanest channel" as determined by the keyless entry module without the portable communication device receiving the channel status update signal will be discussed in FIG. 5.

Figure 5:
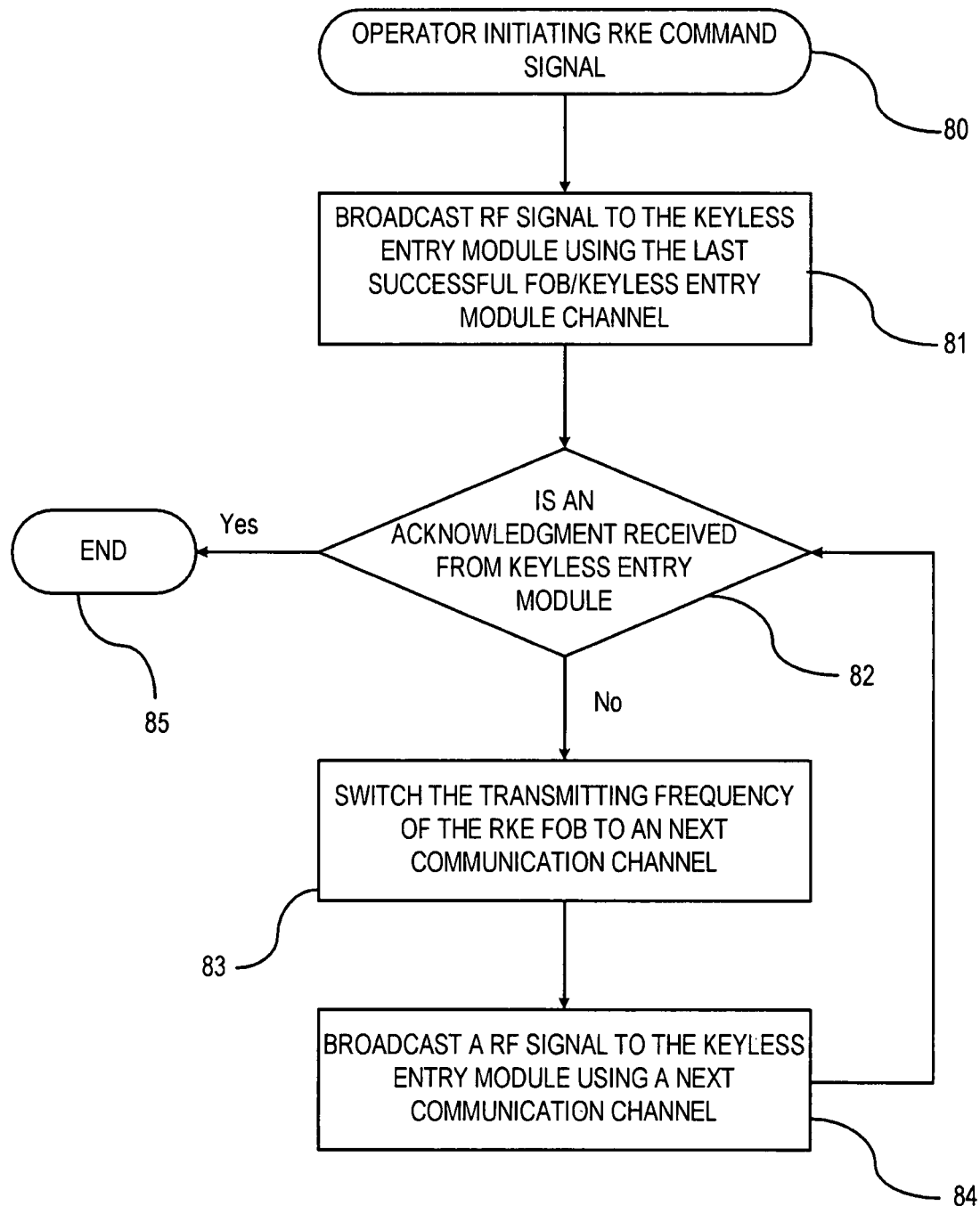
FIG. 5 is a flowchart for a selective multi-channel communication RKE system according to a first preferred embodiment of the present invention.

Under certain occurrences, the operator of the vehicle may be away from the vehicle and during that time period the keyless entry module may determine that a new "clean channel" is present. The keyless entry module will switch over to the new "clean channel", although the RKE fob unaware of the change, will be broadcasting on the last identified "clean channel" that was successfully received by the RKE fob 11 from the keyless entry module 12 (i.e., on the respective channel that was transmitted to the RKE fob as the operator exited the vehicle). FIG. 5 illustrates a method for communication between the RKE fob and the keyless entry module under such an occurrence. In step 80, an operator approaches the vehicle and depresses one of the buttons on the RKE fob for requesting an RKE function. In step 81, a RF signal is broadcast to the keyless entry module using the last success channel communication from the keyless entry module to the RKE fob.

In step 82, a determination is made whether an acknowledgement is received from keyless entry module. If an acknowledgement is received, then a determination is made that the RF signals was successfully communicated to the keyless entry module. The routine terminates in step 85. In step 82, if an acknowledgement is not received, then a determination is made that the RF signal was not received by the keyless entry module. The routine proceeds to step 83 where the transmitting frequency of the RKE fob is switched to a next communication channel.

In step 84, the RF signal is broadcast to the keyless entry module using a next communication channel within the RKE fob. A return is made to step 82 to determine if an acknowledgement signal is received from the keyless entry module indicating that the RF signal is successfully received. If an acknowledgement signal is not received, the routine will continue to loop through steps 82-84 until an acknowledgement signal indicating that the RF signal is successfully received.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A remote keyless entry system for a vehicle comprising:
   (1) a keyless entry module adapted to be disposed within a vehicle and including a receiving circuit, a keyless entry module controller, and a transmitter, wherein:
   (a) the receiving circuit is adapted to receive a remote keyless entry command on a selected one of a plurality of communication channels;
   (b) the keyless entry module controller is responsive to the receipt of a remote keyless entry command by the receiving circuit for generating a signal that is adapted to cause a remote keyless entry function to be performed on the vehicle;
   (c) the keyless entry module controller periodically turns on the receiving circuit during all operational and non-operational times of the vehicle, measures a noise level on each of the plurality of communication channels, and generates an identifier that identifies a selected one of the plurality of communication channels that has a lowest noise level; and
   (d) the transmitter transmits a signal that is representative of the identifier; and
   (2) a portable communication device including a transceiver and a portable communication device controller, wherein:
   (a) the transceiver is adapted to receive the signal that is representative of the identifier;
   (b) the portable communication device controller is responsive to the receipt of the signal that is representative of the identifier for generating a signal that is representative of the selected one of the plurality of communication channels having the lowest noise level; and
   (c) the transceiver is responsive to the signal from the portable communication device controller for transmitting a remote keyless entry command on the selected one of the plurality of communication channels having the lowest noise level in response to a manual activation,
   wherein the keyless entry module controller measures a received signal strength indicator (RSSI) voltage level on each of the plurality of communication channels and identifies which one of the plurality of communication channels has an RSSI voltage level that is closest to a predetermined voltage level defined by a channel in which no signal is present and no noise is present.

2. The remote keyless entry system defined in claim 1 wherein the keyless entry module controller measures the RSSI voltage level at periodic time intervals.

3. The remote keyless entry system defined in claim 1 wherein the keyless entry module controller measures the RSSI voltage level upon a predetermined event occurring.

4. The remote keyless entry system defined in claim 3 wherein the predetermined event is a closing of a vehicle door.

5. The remote keyless entry system defined in claim 3 wherein the predetermined event is an opening of a vehicle door.

6. The remote keyless entry system defined in claim 3 wherein the predetermined event is a turning of an ignition key to an ignition off position.

7. The remote keyless entry system defined in claim 3 wherein the predetermined event is a locking of a vehicle door.

* * * * *